United States Patent [19]

Hubacek

[11] Patent Number: 4,867,414

[45] Date of Patent: Sep. 19, 1989

[54] BALL VALVE

[75] Inventor: Mirek Hubacek, Sutton, Canada

[73] Assignee: Velan Inc., Montreal, Canada

[21] Appl. No.: 295,278

[22] Filed: Jan. 10, 1989

[51] Int. Cl.$^4$ .............................................. F16K 5/06
[52] U.S. Cl. ..................................... 251/315; 137/315
[58] Field of Search ................. 251/174, 315; 137/315

[56] References Cited

U.S. PATENT DOCUMENTS

| | | | |
|---|---|---|---|
| 3,037,738 | 6/1962 | Jackson et al. | 251/172 |
| 3,171,429 | 3/1965 | Stuermer et al. | 137/315 |
| 3,171,431 | 3/1965 | Hansen et al. | 137/454.6 |
| 3,269,691 | 8/1966 | Meima et al. | 251/159 |
| 3,985,334 | 10/1976 | Domyan | 251/159 |
| 4,262,691 | 4/1981 | Kacal | 137/315 |
| 4,266,566 | 5/1981 | Kacal et al. | 137/316 |
| 4,388,945 | 6/1983 | Johnson et al. | 137/315 |
| 4,718,444 | 1/1988 | Boelte | 137/15 |

FOREIGN PATENT DOCUMENTS 823727  4/1981  U.S.S.R. ............................. 251/315

Primary Examiner—John Fox
Attorney, Agent, or Firm—Foley & Lardner, Schwartz, Jeffery, Schwaab, Mack, Blumenthal & Evans

[57] ABSTRACT

A top open ball valve assembly which includes a pair of camming plates, one at the top and one at the bottom of the plug. The camming plates are oval and in their minor axis are clear of the floating valve seats. There are lost motion slots to allow the plug to travel between an open and closed position without moving the camming plates. In the event it is required to retract the valve seats, the plug is rotated more than 90° so as to engage the camming plates to move them so that the major axis of the oval camming plates is aligned with the flow passage of the inlet and outlet ports, and the camming plates engage and retract the floating valve seats. Annular grooves are provided in the valve seat recess and in the valve seat whereby they are radially aligned when the valve seats are retracted, and an elongated coil spring can be inserted in the passage formed by the grooves to block the valve seats in their retracted position.

6 Claims, 2 Drawing Sheets

BALL VALVE

BACKGROUND OF THE INVENTION

1. Field of the Invention

The present invention relates to ball valves, and more particularly, to a valve seat assembly and a device for retracting the valve seats when it is required to disassemble and assemble a top entry ball valve.

2. Description of the Prior Art

The valve seats, in a ball valve, are annular and are sealed against the valve housing by means of an O-ring. They also include a seal which must be constantly urged against the surface of the spherical ball valve or plug because of wear to which the seals are subjected. Springs or other resilient devices may be used to urge the seal against the plug. The seals and plug must be replaced or repaired frequently because of wear which is sometimes accelerated because of abrasive substances present in the fluid.

In order to remove the plug and valve seats for inspection, the spring loaded seals must be retracted from contact with the plug to allow the plug to be rotated to a position to be lifted out of the valve housing.

There have been many attempts to provide floating or spring loaded valve seats with devices for retracting the seals in a top entry ball valve to allow the plug to be removed or inserted. U.S. Pat. No. 4,388,945, issued June 21, 1983 to Johnson et al, discusses some of the earlier attempts to provide devices for retracting the valve seals. The Johnson et al patent offers a solution in the provision of four pins with cam surfaces which are inserted into the cavity through openings provided in the housing and adapted to engage the valve seats and press them rearwardly away from the plug. Other prior art mentioned in the Johnson et al patent are U.S. Pat. No. 4,266,566, issued May 12, 1981 to Kacal et al, which includes threaded bolts for engaging the springs by frictional contact once the valve seats have been retracted by a camming device on the ball or plug. The threaded bolts screw through the valve housing into the spring opening. U.S. Pat. Nos. 3,171,431, issued Mar. 2, 1965 to Hansen et al, and 3,037,738, issued June 5, 1962 to Jackson et al, utilize a screw for advancing the seat towards the plug. However, there is no means for retracting the valve seats once the forward force has been removed.

U.S. Pat. No. 3,985,334, issued Oct. 12, 1976 to Domyan, includes an eccentric extending through the housing to engage the valve seats for retracting the valve seat against the springs.

U.S. Pat. Nos. 3,037,738, to Jackson et al; 3,171,429, issued Mar. 2, 1965 to Stürmer et al; and 4,718,444, issued Jan. 12, 1988 to Boelte; all use some form of threaded pin with a cam surface for engaging the valve seat and pushing it away from its contact with the plug. The threaded pins pass through the housing.

U.S. Pat. No. 3,269,691, issued Aug. 30, 1966, Meima et al, uses a cam pin fixed inside the housing which engages a cam follower track within the valve seat. The valve seat is rotated with a special spanner wrench inserted through the valve casing cover to rotate the valve seat, thereby causing its retraction by means of the cam pin.

All of the prior art requires relatively complicated mechanisms all of which use in one form or another pins or other devices which pass through the housing, thereby increasing the potential for leakage of the valve housing. In the prior art which does not require exterior inserted pin devices, complicated or specialized tooling must be utilized in order to accomplish the retraction of the valve seats.

SUMMARY OF THE INVENTION

It is an aim of the present invention to provide a simplified ball valve of the top entry type having retractable floating valve seats which are easy to maintain and do not require special disassembly tools.

It is a further aim of the present invention to provide a valve in which openings in the exterior housing are kept to a minimum to avoid potential leakage problems with the valve housing.

It is a further object of the present invention to provide a ball valve with spring urged seats which are relatively easily manipulated to allow plug removal as well as removal of the valve seats for inspection or maintenance and is simple and inexpensive to fabricate.

A construction in accordance with the present invention comprises a ball valve housing a valve housing defining a valve chamber and axially aligned inlet and outlet flow passages communicating with the valve chamber. A cylindrical wall in the housing defines a recess of larger diameter than the respective flow passage at each juncture of a flow passage and the valve chamber, the cylindrical wall terminating at an annular shoulder and defining a valve seat recess. A spherical plug having a flow passage is mounted for rotation within the valve chamber between a valve open position when the axis of the plug flow passage is coincident with the axis of the inlet and outlet flow passages and a closed position when the axis of the plug flow passage is at a right angle to the axis of the flow passage of the inlet and outlet flow passages. An access opening is provided in the top of the valve housing communicating with the valve chamber. The periphery of the access opening is concentric with the axis of rotation of the spherical plug. A valve seat assembly is provided in each valve seat recess and comprises an annular valve seat adapted for sliding movement axially of the valve seat recess and means biasing the valve seat against the plug. Seal means are provided between the valve seat assembly and the cylindrical wall forming the valve seat recess, and the valve seat includes seal means in contact with said plug. The improvement is characterized by at least a camming plate being mounted to the plug in a plane perpendicular to the axis of rotation of the plug. The plate includes a continuous camming edge and has a minor axis and a major axis such that when the minor axis is aligned with the axis of the inlet and outlet flow passages, the camming edge is clear of the valve seat allowing the valve seat to contact the plug, and when the major axis of the plate is aligned with the axis of the inlet and outlet flow passages, the camming edge of the plate is in engagement with the valve seat retracting the valve seat from the valve plug. The plate is mounted to the plug with lost motion means, whereby the minor axis will remain in alignment with the axis of the inlet and outlet flow passages during operation between a valve open position and a valve closed position, and the major axis of the plate will be entrained into a position to retract the valve seats when the plug is rotated beyond the angular displacement of the open and closed positions. Means are provided for retaining the valve seat in a retracted position.

In a more specific embodiment of the present invention, the camming plate is provided with arcuate lost motion slots having an arcuate dimension corresponding to the angular displacement between the open and closed positions of the plug, and mounting pins pass through the arcuate slots fastened to the plug in order to mount the plate to the plug.

In a still more specific embodiment, the angular displacement between the open and closed positions of the valve is 90°, and rotation of the plug beyond 90° causes the pins mounting the plate to the plug to engage the ends of the slot and rotate the camming plate with the plug towards a position where the major axis of the camming plate is aligned with the axis of the inlet and outlet flow passages.

In a more specific embodiment of the present invention, there are top and bottom camming plates mounted to the plug in parallel relationship.

In a still more specific embodiment of the present invention, an annular groove is provided in the cylindrical wall of the valve seat recess, and an annular groove is provided in an outer wall of the valve seat located such that when the valve seat is retracted by the camming plate, the groove in the valve seat is aligned with the groove in the cylindrical wall of the valve seat recess, and groove access means are provided in the housing to allow means to be inserted into the passage formed by the radially aligned grooves in order to block the grooves and retain the valve seat in a retracted position.

In a more specific embodiment, the means for blocking the grooves includes an elongated flexible member insertable through the opening in the housing and passable through the annular passage formed by the radially aligned grooves.

As can be seen, the provision of the camming plates on the plug with the lost motion slots allows the camming plates to engage and retract the valve seats only when the plug is rotated more than the 90° arc required to move the plug between a valve open and valve closed position. Once the camming plates have retracted the valve seats into the valve seat recesses, the bonnet of the valve can be removed, and elongated flexible means such as a spiral coil of spring wire can be inserted into the aligned grooves forming the passage, and these coil springs will block the valve seats in their retracted position, allowing the plug to be removed through the access opening of the valve chamber.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figures 1, 2:
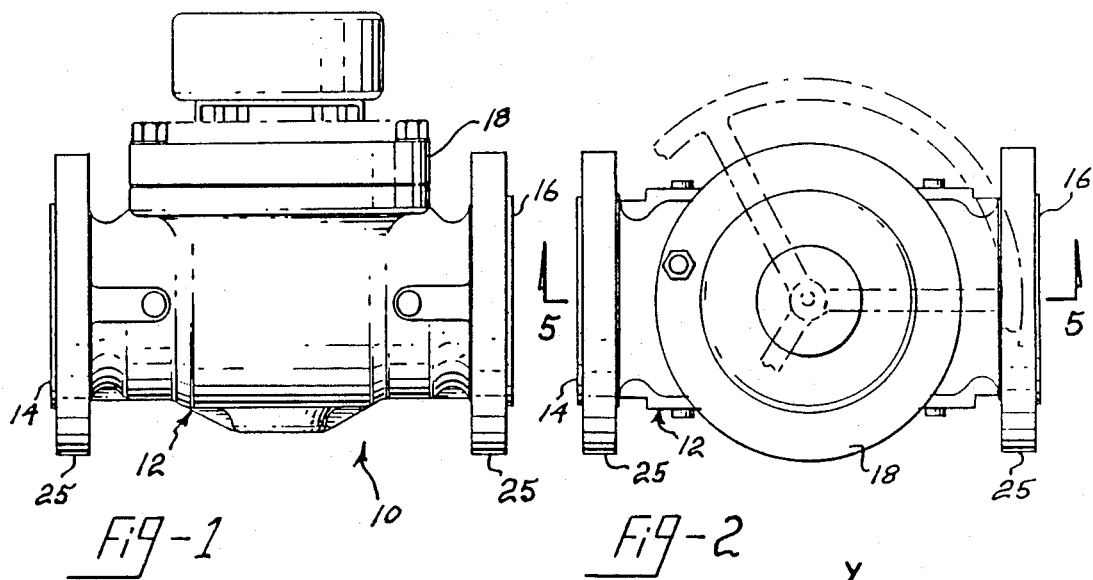
FIG. 1 is a side elevation of a typical top entry ball valve.
FIG. 2 is a top plan view thereof.
Figure 3:
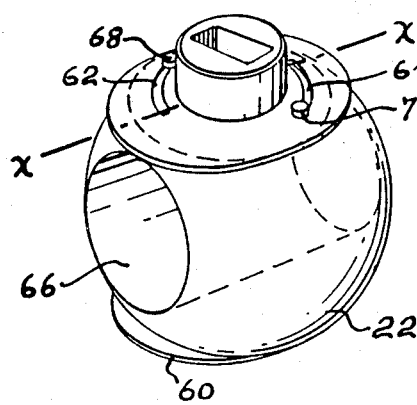
FIG. 3 is a perspective view of a detail of the present invention.

Referring now to the drawings and especially FIGS. 1, 2, 5, and 6, there is shown a typical top entry ball valve 10 having a housing 12 with an inlet flow passage opening 14 and an outlet flow passage opening 16. A bonnet 18 is bolted to the top of the housing 12 and provides for conventional mounting of bearings for the ball valve shaft and the hand wheel and usual packings for the shaft.

Figure 5:
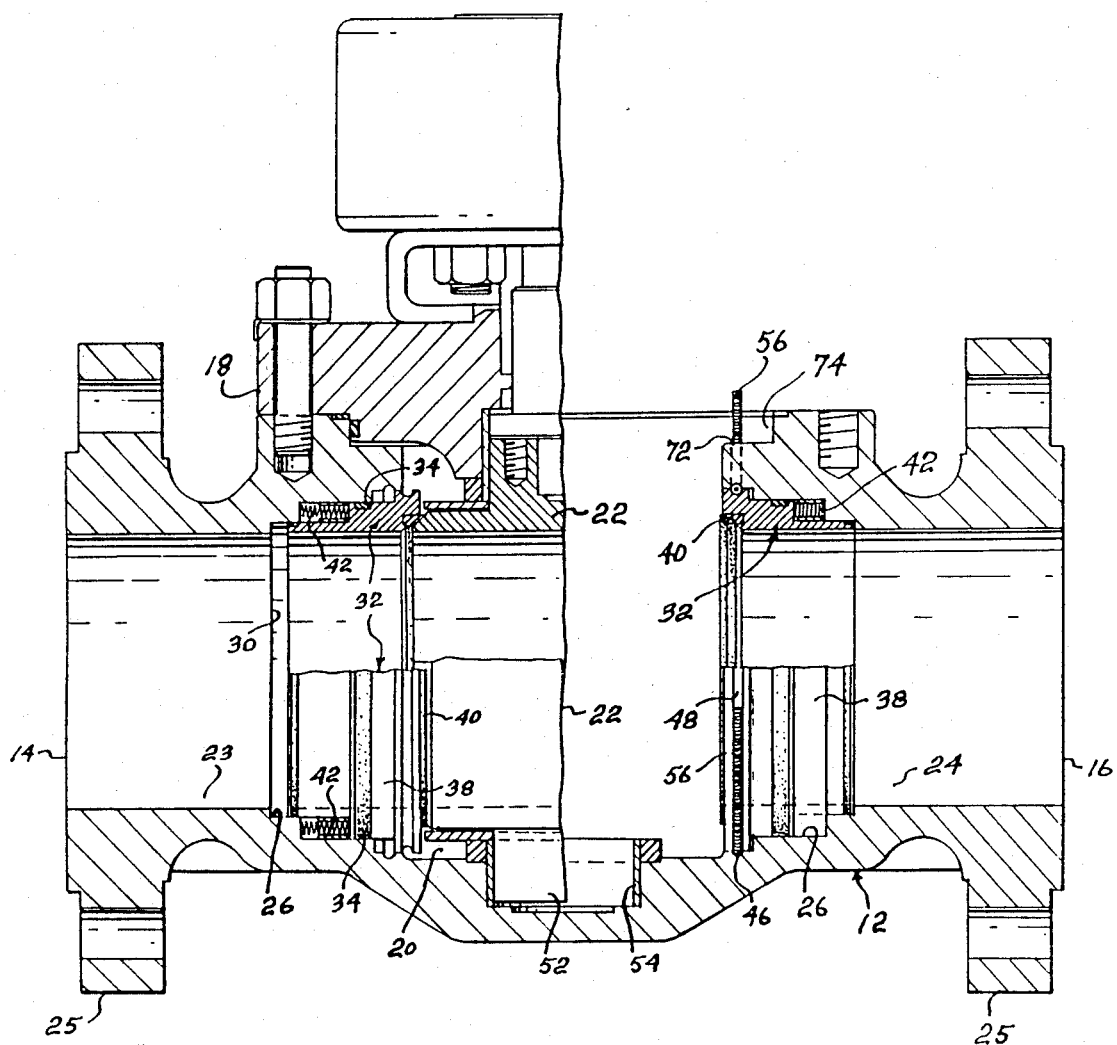
FIG. 5 is a vertical cross-section taken through line 5—5 of FIG. 2.
Figure 6:
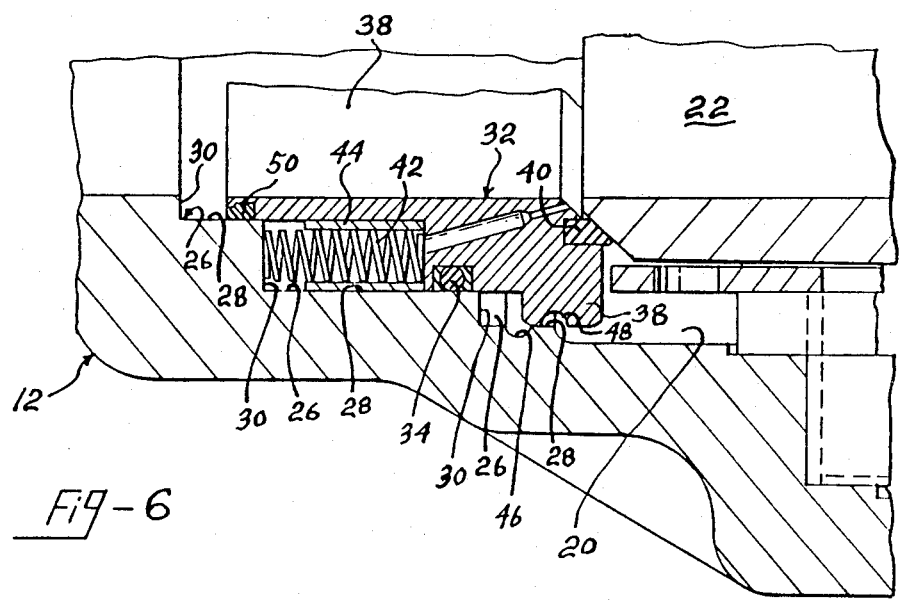
FIG. 6 is a fragmentary enlarged cross-sectional view in the same plane as FIG. 5, but showing a detail thereof.

The interior of the ball valve 10 is illustrated in FIGS. 5 and 6 and includes a valve chamber 20 and a spherical plug 22 having a flow bore 66 adapted to align with the inlet flow bore 23 and the outlet flow bore 24. The housing 12 is provided with flanges 25.

The plug 22 includes a trunnion 52 sitting in a trunnion bearing 54 in the housing 12. The housing 12 defines a valve seat recess 26 having a cylindrical wall 28 and shoulders 30. In the present embodiment, the valve seat recess 26 is stepped. For simplicity, the various stopped cylindrical walls are identified by the same numeral 26, and the annular shoulders 30 are likewise identified by the same numeral.

A valve seat assembly 32 slides axially in the valve seat recess 26. O-rings 34 as well as a Teflon ring 50 are provided on the periphery of the valve seat assembly 32 for sealing engagement with the cylindrical walls 26 in the sliding movement of the valve seat 38. The valve seat assembly 32 includes a valve seat 38, an annular seal 40 adapted to engage the outer surface of the plug 22, and a plurality of springs 42, each mounted in spring sleeves 28 engaging the shoulder 30 in the recess 26 and a shoulder formed on the valve seat 38. This is more clearly shown in FIG. 6.

The outer surface of the valve seat 38 is provided with an annular groove 48 of semicircular cross-section. Likewise, an annular groove 46 is provided in the cylindrical wall 28 defining the recess 26. When the valve seat 38 is in normal contact with the plug 22 under the urging of the spring 42, the grooves 48 and 46 are not in alignment as shown in FIG. 6 as well as in the left-hand side of FIG. 5. When the valve seat 38 is retracted as will be described later, the grooves 46 and 48 come into radial alignment as illustrated in the right-hand side of FIG. 5.

Figure 7:
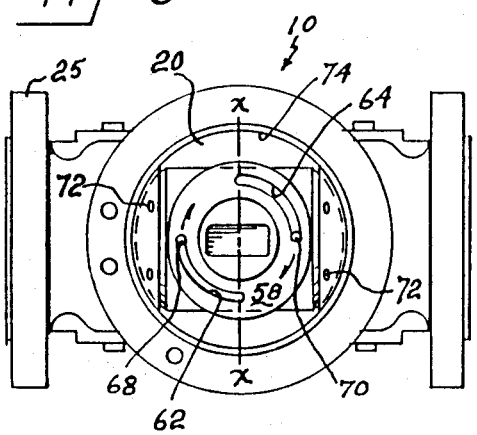
FIGS. 7 and 8 are top plan views of the valve with the bonnet removed showing different sequential positions.
Figure 8:
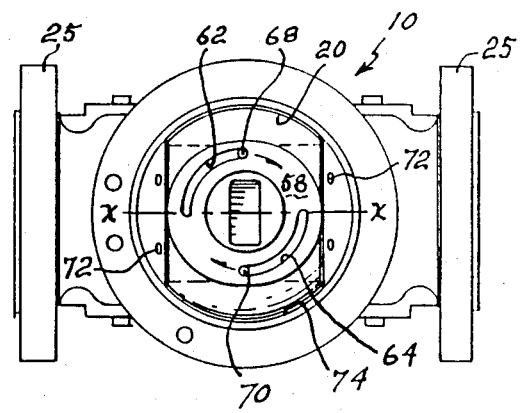

The groove 46 communicates with an access opening 72 in the top of the housing within the access opening 74. These openings 72 can best be seen in FIGS. 7 and 8.

Figure 4:
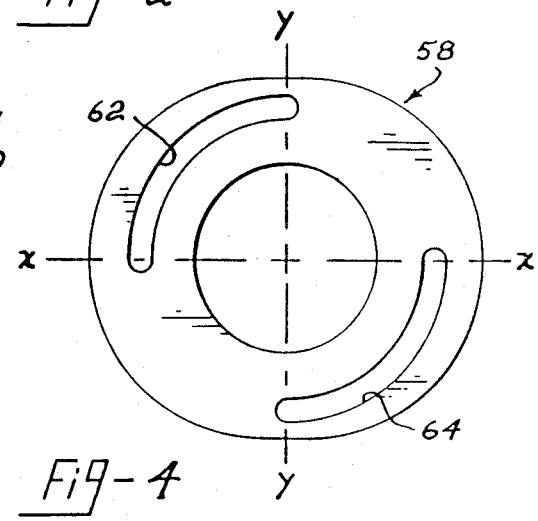
FIG. 4 is a top plan view of a detail of the device shown in FIG. 3.

Referring now to FIGS. 3, 4, 7, and 8, the plug 22 is shown with camming plates 58 and 60 mounted to the top and bottom thereof. Each camming plate is provided with arcuate slots 62 and 64 which act as lost motion slots. Anchoring pins 68 and 70 pass through the lost motion slots 62 and 64 and are fastened to the top of the plug 22. Each plate 58 and 60 is, in this case, oval, having a major axis X—X. A minor axis Y—Y is also shown in FIG. 4. The dimension along the X—X axis is, of course, greater than the minor axis along axis Y—Y.

In normal operation of the valve, the plug 22 will be turned between an open position with the bore 66 aligned with bores 23 and 24 and a closed position with the axis of the bore 66 at 90° to the axis of the bores 23 and 24. In travel between either of these two positions, the pins 68 and 70 will merely travel in the lost motion slots 62 and 64 with the minor axis Y—Y aligned with the axis of the bores 23 and 24.

If it is required to remove the plug for inspection or maintenance of the plug or the valve seat, the plug is rotated more than 90° up to 180° so that the X—X axis, that is, the major axis of the plate 58, will align itself with the axes of the bores 23 and 24. The diameter or width of the plate along the Y—Y axis is such that it does not contact the valve seat 38, and rotation of the plate so that the axis X—X is in line with the bores 23 and 24 will bring the greater dimension of the plates in line to contact the valve seats 38 and move them against the urging of the springs 42 until the grooves 48 and 46 come into radial alignment. At that point, the bonnet 18 is removed leaving access to the valve chamber 20 through the access opening 74, and coil springs 56 are inserted through the opening 72 to pass down into the passage formed by the aligned grooves 46 and 48. Once the coil springs 56 have been inserted therewith, they can block the valve seats in the retracted position.

The plug 22 is then rotated so that the X—X axis of the plates 58 and 60 are no longer in contact with the valve seats 38, and the plug 22 can be lifted out of the valve chamber 20. Likewise, access can be had to the valve seat for inspection or maintenance, and it is merely necessary to apply pressure against either one of the valve seats 38 to remove the coil 56 and thus remove the valve seat assembly 32 from the valve seat recess 26.

In order to assemble the valves, the plug 22 is inserted in the valve chamber 20 and rotated such that the X—X axis of the plate 58 is aligned with the axis of the passages 23 amd 24 and in contact with the valve seat 38. The coil springs 56 are then removed, and the valve plug 22 is rotated to the point where the Y—Y axis is thus aligned with the valve flow passage bores 23 and 24, and the plug 22 can now be rotated in a 90° arc between an open and closed position within the travel of the lost motion slots 62 and 64.

I claim:

1. A ball valve comprising a valve housing defining a valve chamber, axially aligned inlet and outlet flow passages communicating with the valve chamber, a cylindrical wall in the housing defining a recess of larger diameter with the respective flow passage at each juncture of a flow passage in the valve chamber, the cylindrical wall terminating at an annular shoulder and defining a valve seat recess; a spherical plug having a flow passage mounted for rotation within the valve chamber between a valve open position when the axis of the plug flow passage is coincident with the axis of the inlet and outlet flow passages and a closed position when the axis of the plug flow passage is at a right angle to the axis of the flow passage of the inlet and outlet flow passages; an access opening provided in the top of the valve housing communicating with the valve chamber and the periphery of the access opening is concentric with the axis of rotation of the spherical plug, a valve seat assembly provided in each valve seat recess and comprising an annular valve seat adapted for sliding movement axially of the valve seat recess, and means biasing the valve seat against the plug, seal means provided between the valve seat assembly and the cylindrical wall forming the valve seat recess, and the valve seat incuding seal means in contact with said plug; the improvement including at least a camming plate mounted to the plug in a plane perpendicular to the axis of rotation of the plug, said plate including a continuous camming edge and having a minor axis and a major axis such that when the minor axis is aligned with the axis of the inlet and outlet flow passages, the camming edge is clear of the valve seat allowing the valve seat to contact the plug, and when the major axis of the plate is aligned with the axis of the inlet and outlet flow passages, the camming edge of the plate is in engagement with the valve seat, thereby retracting the valve seat from the valve plug, said plate being mounted to the plug with lost motion means, whereby the minor axis will remain in alignment with the axis of the inlet and outlet flow passages during operation between a valve open position and a valve closed position, and the major axis of the plate will be entrained into a position to retract the valve seats when the plug is rotated beyond the angular displacement of the open and closed positions, and means are provided for retaining the valve seat in a retracted position.

2. A ball valve as defined in claim 1, wherein the lost motion means includes a pair of arcuate slots defined in the plate and pins pass through the slots and are fastened to the plug and the arcuate dimension of the slots correspond to the angular displacement of the plug between the open and closed positions such that the plate is not moved when the plug is rotated between the open and closed positions.

3. A ball valve as defined in claim 2, wherein there is a pair of identical plates, one at the top and the other at the bottom of the plug and mounted to the plug, and the plates are in parallel relationship one to the other and are adapted to engage and disengage the valve seats in unison.

4. A ball valve as defined in claim 2, wherein the cylindrical wall defining the valve seat recess is provided with an annular groove, and an annular groove is provided in the outer wall of the valve seat, and the location of the annular groove on the valve seat is such that when the valve seat is retracted on urging of the camming plate, it is in radial alignment with the annular groove in the cylindrical wall, and elongated flexible blocking means are provided for entry through an access opening in the housing to communicate with the radially aligned grooves such that the elongated flexible blocking means can be inserted into the passage formed by the aligned grooves such as to retain the valve seat in a retracted position.

5. A ball valve as defined in claim 4, wherein the elongated flexible blocking means is a coil spring.

6. A ball valve as defined in claim 1, wherein the camming plate is in the form of an oval plate having the longer dimension along the major axis.

* * * * *